United States Patent
Beard et al.

(10) Patent No.: US 11,221,882 B2
(45) Date of Patent: Jan. 11, 2022

(54) RESOURCE ALLOCATION

(71) Applicant: Nokia Technologies Oy, Espoo (FI)

(72) Inventors: Timothy Giles Beard, Cambridge (GB); David Michael Duffy, Cambridge (GB); Matthew John Lawrenson, Chesterfield, MO (US)

(73) Assignee: Nokia Technologies Oy, Espoo (FI)

( * ) Notice: Subject to any disclaimer, the term of this patent is extended or adjusted under 35 U.S.C. 154(b) by 136 days.

(21) Appl. No.: 16/828,684

(22) Filed: Mar. 24, 2020

(65) Prior Publication Data
US 2020/0319931 A1    Oct. 8, 2020

(30) Foreign Application Priority Data
Apr. 5, 2019 (EP) ..................... 19167703

(51) Int. Cl.
*G06F 9/46* (2006.01)
*G06F 9/50* (2006.01)

(52) U.S. Cl.
CPC .......... *G06F 9/5022* (2013.01); *G06F 9/5027* (2013.01); *G06F 2209/503* (2013.01); *G06F 2209/508* (2013.01); *G06F 2209/5021* (2013.01)

(58) Field of Classification Search
CPC ............... G06F 9/5022; G06F 9/5027; G06F 2209/5021; G06F 2209/503; G06F 2209/508
See application file for complete search history.

(56) References Cited

U.S. PATENT DOCUMENTS

| | | |
|---|---|---|
| 5,855,008 A | 12/1998 | Goldhaber et al. |
| 8,527,339 B2 | 9/2013 | Gunawardana et al. |
| 2003/0069828 A1 | 4/2003 | Blazey et al. |
| 2010/0251147 A1 | 9/2010 | Donovan et al. |
| 2014/0278929 A1 | 9/2014 | Bhatia et al. |
| 2016/0063540 A1 | 3/2016 | Luan |
| 2017/0116952 A1 | 4/2017 | Wang et al. |
| 2017/0222940 A1* | 8/2017 | O'Kelley ............. H04L 47/70 |

FOREIGN PATENT DOCUMENTS

WO    2017/025797 A1    2/2017

OTHER PUBLICATIONS

"Problematic Smartphone Use", Wikipedia, Retrieved on Mar. 19, 2020, Webpage available at : https://en.wikipedia.org/wiki/Problematic_smartphone_use.

(Continued)

*Primary Examiner* — Diem K Cao
(74) *Attorney, Agent, or Firm* — Nokia Technologies Oy

(57) ABSTRACT

An apparatus comprising means for receiving a token bid for an application to access a user-output resource of the apparatus; controlling access to the user-output resource of the apparatus in dependence upon at least the token bid for the application to access the user-output resource of the apparatus; and providing tokens for use in one or more token bids for the application to access the user-output resource of the apparatus wherein the number of tokens provided for token bids for the application is dependent upon at least a monitored behavior of the user.

20 Claims, 5 Drawing Sheets

(56) References Cited

OTHER PUBLICATIONS

"The Attention Monetization", Feedough, Retrieved on Mar. 19, 2020, Webpage available at : https://www.feedough.com/the-attention-monetization/.

"Turn Off Your Push Notifications. All of Them", Wired, Retrieved on Mar. 19, 2020, Webpage available at : https://www.wired.com/story/turn-off-your-push-notifications/.

"One Third of Smartphone Notifications Make Our Mood Worse, Research Shows", The Telegraph, Retrieved on Mar. 19, 2020, Webpage available at : https://www.telegraph.co.uk/science/2017/10/02/one-third-smartphone-notifications-make-mood-worse-research/.

"Push Notifications: One Way to Increase In-App Purchases That Works", App Annie, Retrieved on Mar. 19, 2020, Webpage available at : https://www.appannie.com/en/insights/mobile-strategy/push-notifications-one-way-to-increase-in-app-purchases-that-works/.

"Activity Recognition with Smartphone Sensors", CUNY_GC, Retrieved on Mar. 19, 2020, Webpage available at : https://www.gc.cuny.edu/CUNY_GC/media/Computer-Science/Student%20Presentations/Xing%20Su/Second_Exam_Slides_Xing_Su_6-12-2014.pdf.

Su et al. "Activity Recognition with Smartphone Sensors", Tsinghua Science and Technology, vol. 19 , Issue: 3, Jun. 2014, 15 pages.

"Efficient Computing Group", ECG, Retrieved on Mar. 19, 2020, Webpage available at : http://www.ruf.rice.edu/~mobile/publications/likamwa2013mobisys2.pdf.

Ma et al., "Daily Mood Assessment Based on Mobile Phone Sensing", Ninth International Conference on Wearable and Implantable Body Sensor Networks, May 9-12, 2012, pp. 142-147.

Li et al., "Online Auction for IaaS Clouds: Towards Elastic User Demands and Weighted Heterogeneous VMs", IEEE Conference on Computer Communications, May 1-4, 2017, 9 pages.

"Google Ad words", Google, Retrieved on Mar. 19, 2020, Webpage available at : https://ads.google.com/intl/en_in/home/.

"Lower CPC and Better Google Ad Positioning: the Key is in the Quality Score", New Media Campaigns, Retrieved on Mar. 19, 2020, Webpage available at : https://www.newmediacampaigns.com/page/lower-cpc-and-better-google-ad-positioning-the-key-is-in-the-quality-score.

"Facebook Ads Bidding in 2018: Everything You Need to Know ( . . . supported by Data)", AdEspresso, Retrieved on Mar. 19, 2020, Webpage available at : https://adespresso.com/blog/everything-need-know-facebook-ads-bidding/.

Extended European Search Report received for corresponding European Patent Application No. 19167703.8, dated Oct. 15, 2019, 9 pages.

\* cited by examiner

RESOURCE ALLOCATION

TECHNOLOGICAL FIELD

Embodiments of the present disclosure relate to resource allocation. Some relate to user-output resource allocation.

BACKGROUND

Modern computer systems typically use a central controller, such as a central processing unit, to control access to resources such as user-output resources. For example the central controller can control whether or not content is displayed in a display and if content is displayed can control what is displayed, where it is displayed, when it is displayed and how it is displayed.

An application is software designed for a specific application (function). Modern computer systems are configured to selectively run different applications at different times. Some modern computer systems are configured to run multiple applications concurrently at the same time, for example, by using threading on single or multi-processor systems.

In some circumstances a demand for a shared resource from applications exceeds available supply, causing resource contention. An operating system for the computer system can be tasked with resolving resource contention by controlling resource allocation.

BRIEF SUMMARY

According to various, but not necessarily all, embodiments there is provided an apparatus comprising means for:
receiving a token bid for an application to access a user-output resource of the apparatus;
controlling access to the user-output resource of the apparatus in dependence upon at least the token bid for the application to access the user-output resource of the apparatus; and
providing tokens for use in one or more token bids for the application to access a user-output resource of the apparatus wherein the number of tokens provided for token bids for the application is dependent upon at least a monitored behavior of the user.

In some but not necessarily all examples, the means is configured to provide tokens for use in one or more token bids for the application, wherein the number of tokens provided for token bids for the application is dependent upon an impact of the application on user behavior determined from at least the monitored behavior of the user.

In some but not necessarily all examples, the means is configured to provide tokens for use in one or more token bids for the application, wherein the number of tokens provided for token bids for the application is dependent upon a machine learning classification of the application based on at least the monitored behavior of the user.

In some but not necessarily all examples, the means is configured to provide tokens for use in one or more token bids for the application, wherein the number of tokens provided for token bids for the application is dependent upon an expected impact of the application on user behavior learned from at least monitored behavior of the user associated with the application.

In some but not necessarily all examples, the means is configured to, for each of a plurality of applications:
provide tokens for use in one or more token bids for an application to access a user-output resource of the apparatus wherein the number of tokens provided for token bids for the application is dependent upon at least a monitored behavior of the user; and
receive a token bid for the application to access a user-output resource of the apparatus; wherein the means is configured to enable one of the plurality of applications to access the user-output resource of the apparatus in dependence upon at least the received plurality of token bids for the applications to access the user-output resource of the apparatus.

In some but not necessarily all examples, the means is configured to enable access to a first one of the plurality of applications to the user-output resource of the apparatus in dependence upon at least a token bid for the first one of the plurality of applications to access the user-output resource being a winning token bid from amongst the plurality of received token bids.

In some but not necessarily all examples, the means is configured to control which application is granted access to the user-output resource in dependence upon multiple variables, wherein one variable is which token bid is highest, and wherein the user has at least some control on the dependency upon multiple variables and/or upon the multiple variables.

In some but not necessarily all examples, the total number of tokens provided to all applications per period of time or per period of user interaction time is fixed.

In some but not necessarily all examples, the provided tokens comprise a minimum number of tokens for at least some applications.

In some but not necessarily all examples, the apparatus comprises at least one output device for providing sensory output to the user, wherein the user-output resource is a time segment of the output device that enables use of the output device to provide a sensory output to the user.

In some but not necessarily all examples, the apparatus comprises a bidder entity configured to make a token bid for the application to access the user-output resource, wherein the bidder entity is part of the application running in an operating system environment of the apparatus or the bidder entity is a proxy that is an integral part of an operating system environment of the apparatus, wherein the token bid is part of a request identifying at least the user-output resource, wherein the request has the same common format whether originating from the application or a proxy.

In some but not necessarily all examples, the bidder entity is configured to manage a supply of tokens for use in one or more token bids for the application to access a user-output resource, the supply of tokens comprising the provided tokens, if any, plus additional first tokens transferred from supplies of tokens for use in one or more token bids for other applications to access a user-output resource, if any, minus second tokens transferred from the supply of tokens for use in one or more token bids for the application to one or more supplies of tokens for use in one or more token bids for other applications.

In some but not necessarily all examples, after a bidder entity has made a token bid for an application to access a user-output resource, feedback is provided to the bidder entity on a winning bid.

In some but not necessarily all examples, the means is configured to enable the user to define one or more goals, wherein the number of tokens provided for token bids for the application is dependent upon at least an impact of the application on a user achieving the defined one or more goals.

According to various, but not necessarily all, embodiments there is provided a method comprising:

receiving token bids for an application to access a user-output resource of an apparatus;

controlling access to the user-output resource of the apparatus in dependence upon at least the token bid for the application to access the user-output resource; and providing tokens for use in one or more token bids for the application to access a user-output resource of the apparatus wherein the number of tokens provided for token bids for the application is dependent upon at least a monitored behavior of the user.

According to various, but not necessarily all, embodiments there is provided a computer program comprising computer program instructions that when run on a processor cause:

receiving a token bid for an application to access a user-output resource of an apparatus;

controlling access to the user-output resource in dependence upon at least a token bid for the application to access the user-output resource; and providing tokens for use to access a user-output resource of the apparatus for the application wherein the number of tokens provided for token bids for the application is dependent upon at least a monitored behavior of the user.

According to various, but not necessarily all, embodiments there is provided an apparatus comprising:

at least one processor; and at least one memory including computer program code the at least one memory and the computer program code configured to, with the at least one processor, cause the apparatus at least to perform:

controlling access to the user-output resource in dependence upon at least a received token bid for the application to access the user-output resource; and providing tokens for use to access a user-output resource of the apparatus for the application wherein the number of tokens provided for token bids for the application is dependent upon at least a monitored behavior of the user.

According to various, but not necessarily all, embodiments there is provided an apparatus comprising means for:

enabling a user to define one or more goals;

receiving a token bid for an application to access a user-output resource of the apparatus; automatically controlling access to the user-output resource of the apparatus in dependence upon at least the token bid for the application to access the user-output resource of the apparatus; and providing tokens used in token bids for the application wherein the number of tokens provided for token bids for the application is dependent upon at least an expected impact of the application on a user achieving the defined one or more goals.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

Figure 1:
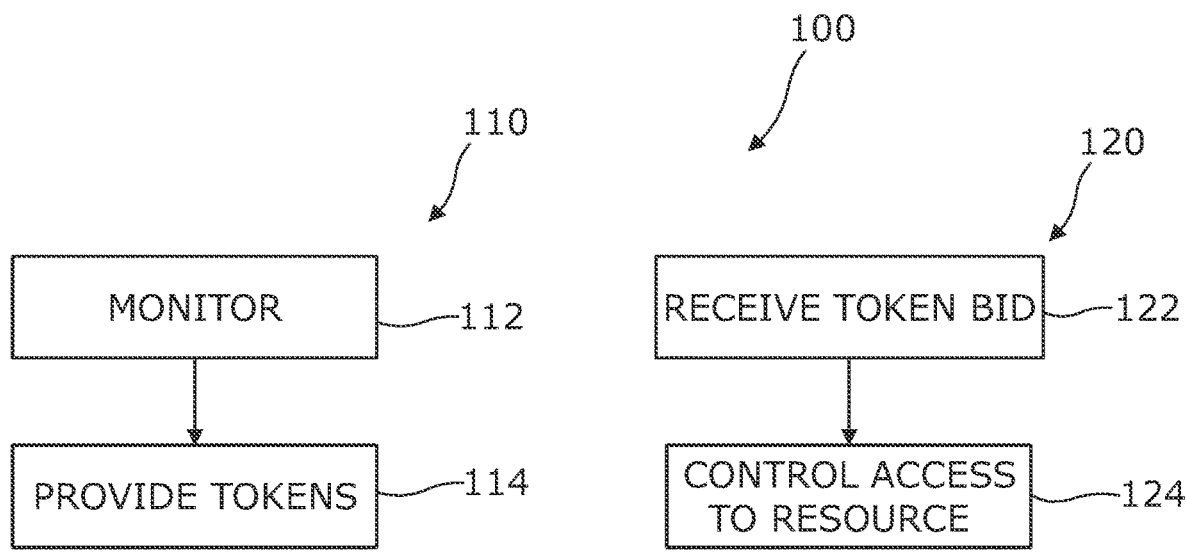
FIG. 1 show an example embodiment of the subject matter described herein.
Figure 2:
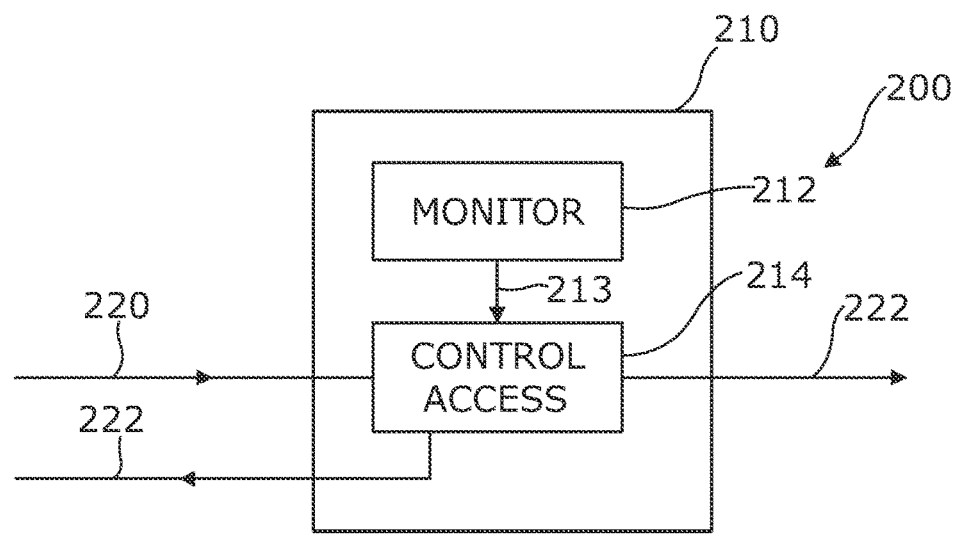
FIG. 2 shows another example embodiment of the subject matter described herein.

FIG. 1 illustrates an example of a method 100 for controlling resource allocation. The method 100 comprises a first sub-method 110 for enabling token bidding for resource access and a second sub-method 120 for enabling resource access via token bidding.

In this example, the resource is a user-output resource of an apparatus and the token bidding is bidding, using tokens, for an application to access the user-output resource of the apparatus.

The first sub-method 110 comprises, at block 112, monitoring a behavior of a user of the apparatus. The first sub-method 110 then comprises, at block 114, providing tokens for use in one or more token bids for an application to access a user-output resource of an apparatus. The number of tokens provided for token bids for the application is dependent upon at least the monitored behavior of the user.

The second sub-method 120 comprises, at block 122, receiving one or more token bids for an application to access a user-output resource of the apparatus. The second sub-method 120 then comprises, at block 124, controlling access to the user-output resource of the apparatus in dependence upon at least a token bid for the application to access the user-output resource.

In some but not necessarily all examples, the method 100 is used to control resource allocation for some but not necessarily all applications. For example, the method 100 is not used for a sub-set of applications. In some examples, the sub-set of applications are selected by a user. In some examples, the sub-set of applications are high priority (low latency) applications such as, for example, an alarm clock, a reminder or a high-priority or real-time messaging service.

FIGS. 2, 3A, 3B and 3C illustrate examples of an apparatus 200 that is suitable for performing the method 100.

The apparatus 200 comprises a controller 210. The controller 210 is configured to receive a token bid 220 for an application 240 to access a user-output resource 230 of the apparatus 200.

In this example, the controller 210 comprises a monitor module 212 that is configured to monitor behavior 213 of the user of the apparatus 200.

In this example, the controller 210 also comprises a control module 214 configured to provide tokens 222 for use in one or more token bids 220 for the application 240 to access the user-output resource 230 of the apparatus 200. The number of tokens 222 provided for token bids 220 for the application 240 is dependent upon at least the monitored behavior 213 of the user of the apparatus 200.

In this example, the control module 214 is additionally configured to receive a token bid 220 for an application 240 to access a user-output resource 230 of the apparatus 200. The control module 214 is additionally configured to control access to the user-output resource 230 of the apparatus 200 in dependence upon at least the token bid 220 for the application 240 to access the user-output resource 230 of the apparatus 200.

The controller 210 may be provided by any suitable hardware or circuitry. The modules 212, 214 may be hardware modules of the controller 210 or may be functional modules of the controller 210 and can be enabled by firmware or software. For example, in some implementations the controller 210 is a processor, for example a central processing unit, running an operating system. The modules 212, 214 represent functionality provided by the operating system when run on the processor.

In some, but not necessarily all, examples, the control module 214 is configured to automatically control access to the user-output resource 230 of the apparatus 200 in dependence upon at least the token bid 220 for the application 240 to access the user-output resource 230 of the apparatus 200. In this context, automatically means that the access control occurs without a specific requirement for the user to approve that access. The operation is transparent to the user.

Figure 3A:
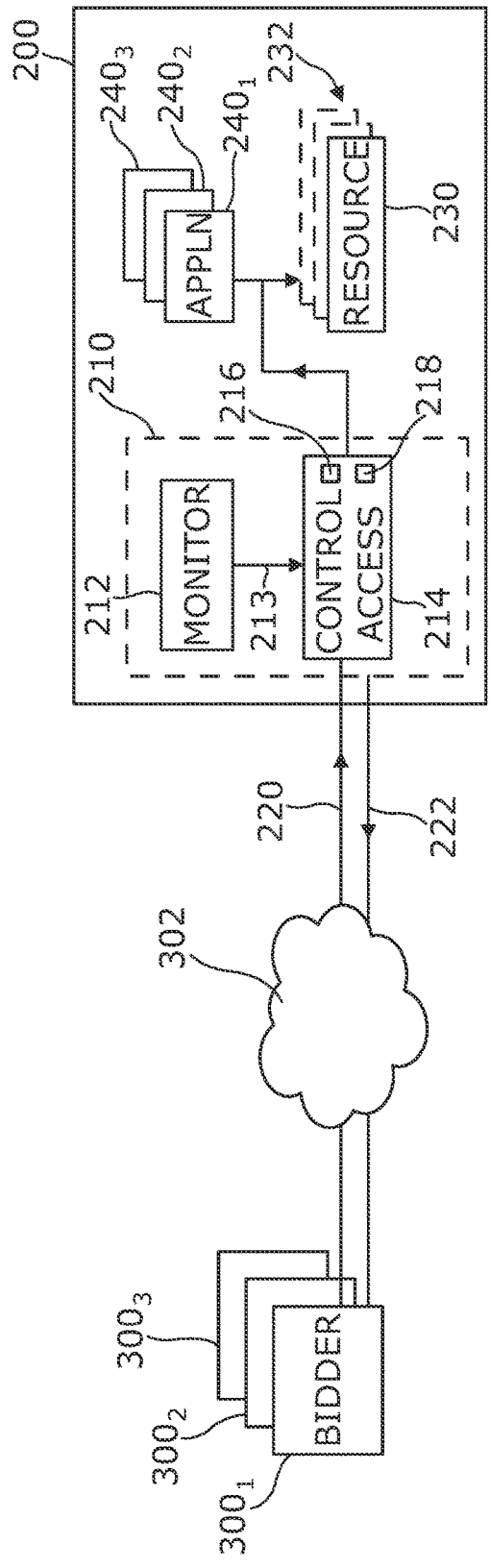
FIG. 3A, 3B, 3C show example embodiments of the subject matter described herein.
Figure 3B:
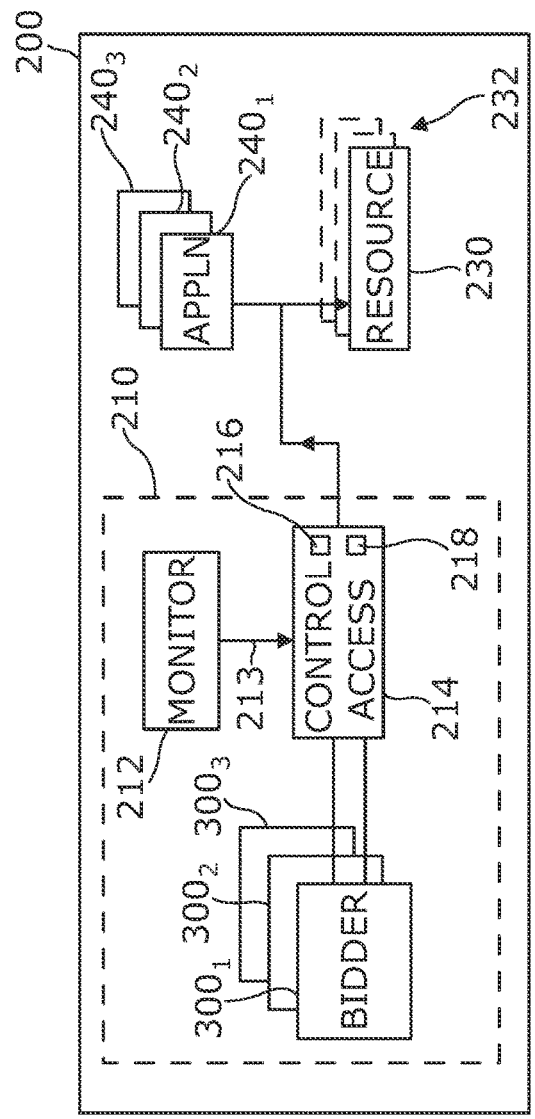
Figure 3C:
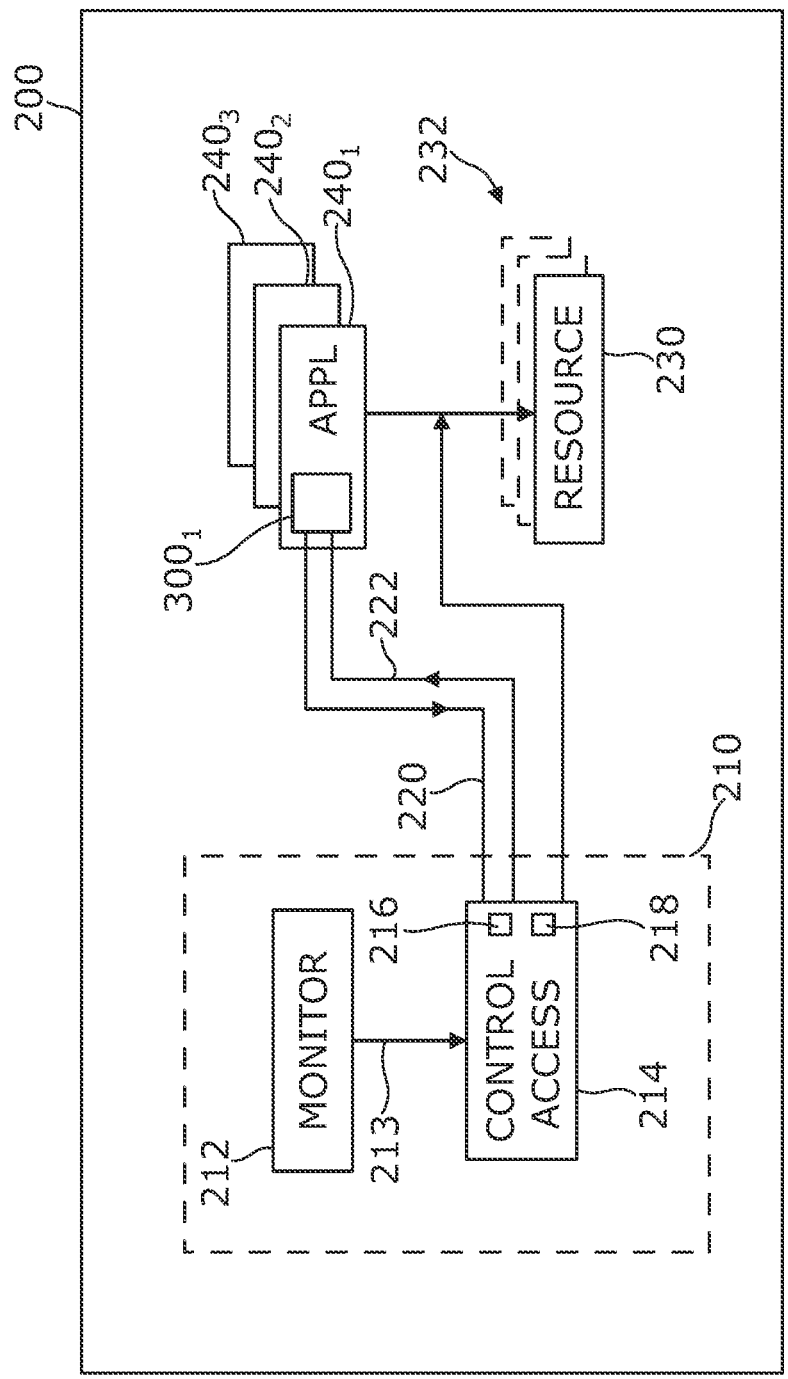

It should be noted that in some but not necessarily all examples, such as those illustrated in FIGS. 3A, 3B and 3C, the apparatus 200 comprises multiple applications 240. Each different application 240 is separately labelled $240_i$. The method 100 as described in relation to FIG. 1 can be performed independently in relation to each application $240_i$.

It should be noted that in some but not necessarily all examples, such as those illustrated in FIGS. 3A, 3B and 3C, the apparatus 200 can additionally or alternatively control access to multiple user-output resources 230. Each different user-output resource 230 could be separately labelled $230_j$. The method 100 as described in relation to FIG. 1 can be performed independently in relation to each user-output resource $230_j$.

In the examples illustrated in FIGS. 3A, 3B and 3C, the apparatus 200 comprises at least one output device 232 for providing sensory output to the user. A user-output resource 230, in this example, is a time segment of the output device 232 that enables use of the output device 232 to provide a sensory output to the user. Examples of sensory output include output that can be sensed by a user. For example, the output device 232 can be or can include a display. For example, the output device 232 can be or can include a loud speaker or an audio output interface. For example, the output device 232 can be or can comprise a haptic device.

The length of a time segment can depend upon an identity of the user-output resource 230. For example, the time segment for an application icon location on the apparatus 200 home screen may be a week long, whereas a timeslot for a banner advert may be 10 seconds.

In the examples of FIGS. 3A, 3B and 3C, the token bid 220 is provided by a bidder entity 300. There is a bidder entity 300 for at least some of the applications $240_i$.

In the example of FIG. 3A, the bidder entity 300 is an exterior bidder entity that is not within the apparatus 200. In this example, the exterior bidder entity 300 communicates via a network 302 with the apparatus 200.

In contrast, in the examples of FIGS. 3B and 3C, the bidder entity 300 is an interior bidder entity within the apparatus 200. In the examples illustrated, the interior bidder entity $300_i$ is a proxy bidder entity that replicates the operation of an exterior bidder entity. The proxy bidder entity $300_i$ is provided by the controller 210. For example, it may be a function of the operating system as illustrated in FIG. 3B or an integral function of the application $240_i$ that it bids for as illustrated in FIG. 3C.

It will therefore be appreciated that the token bid $220_i$ for an application $240_i$ may originate from the application $240_i$ itself or may originate from a bidder entity $300_i$ that bids on behalf of the application $240_i$. The term "a token bid for an application to access a user-output resource of the apparatus" should be interpreted accordingly. That is, the token bid 220 is 'for an application' $240_i$ and in some examples, but not necessarily all examples, the token bid 220 can originate from the application $240_i$ but in other examples it may originate from outside the application $240_i$.

It will therefore be appreciated that the apparatus 200 can comprise a bidder entity $300_i$ configured to make a token bid $220_i$ for an application $240_i$ to access a user-output resource $230_j$, wherein the bidder entity $300_i$ is part of the application $240_i$ running in an operating system (OS) environment of the apparatus 200 or the bidder entity $300_i$ is a proxy that is an integral part of an operating system environment of the apparatus 200 or the application $240_i$, wherein the token bid $220_i$ is part of a request identifying at least the user-output resource 230.

In some, but not necessarily all, examples, a bidder entity $300_i$ for one application $240_i$ can be comprised within the application $240_i$ or another application $240_j$, whereas a bidder entity $300_k$ for a further application $240_k$ may not be comprised within the application $240_j$ or any application 240 (it may for example be an internal bidder entity 300 of the operating system or an external bidder entity 300). To enable this functionality, in some, but not necessarily all, examples, a common format is used for token bids 220. The common format for the token bid 220 identifies at least a demand for the user-output resource 230 and the application 240. This common format for the token bid 220 is used wherever the bidder entity 300 is located.

In some, but not necessarily all, examples, the control module 214 comprises a first sub-module 216 for enabling token bidding for resource access and a second sub-module 218 for enabling resource access via token bidding. The operation of the first sub-module 216, in some examples, corresponds to block 114 in FIG. 1 and the operation of the second sub-module 218, in at least some examples, corresponds to the operation of blocks 122, 124 in FIG. 1.

Figure 4:
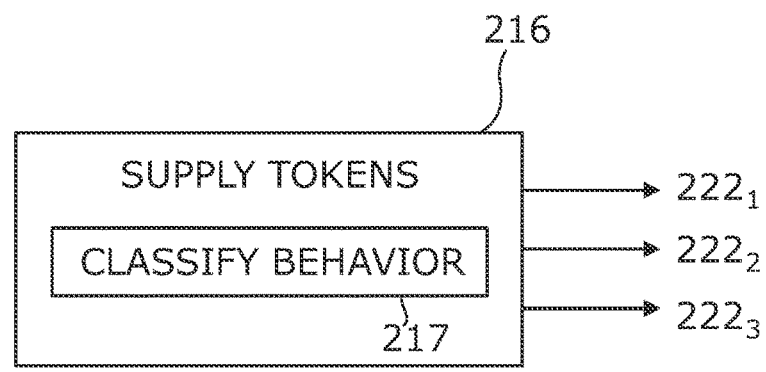
FIG. 4 shows another example embodiment of the subject matter described herein.

FIG. 4 illustrates an example of a first sub-module 216 for enabling token bidding 220 for resource access. The sub-module 216 is configured to provide tokens 222 for use in one or more token bids 220 for one or more applications 240 to access the user-output resource 230 of the apparatus 200. The number of tokens 222 provided for token bids 220 for an application 240 is dependent upon at least a monitored behavior 213 of the user of the apparatus 200.

In the example illustrated, tokens $222_1$ are provided for use in one or more token bids $220_1$ for a first application $240_1$. Tokens $222_2$ are provided for use in one or more token bids $220_2$ for a second application $240_2$. Tokens $222_3$ are provided for use in one or more token bids $220_3$ for a third application $240_3$ to access the user-output resource 230. The tokens 222 provided are the same.

Although, in the above-described example, the tokens 222 are described as for use in one or more token bids 220 for an application 240 to access the user-output resource 230, it should be understood that in some examples the tokens 222 can be used in one or more token bids 220 for an application 240 to access any one or more of a multiple number of user-output resources 230 of the apparatus 200.

In the example illustrated, the number of tokens $222_i$ provided for token bids $220_i$ for an application $240_i$ is dependent upon classification of the application $240_i$ based on at least the monitored behavior 213 of the user. In some examples, a machine learning classifier 217 such as a support vector machine or K-means clustering may be used for classification of the application 240 based on at least the monitored behavior 213 of the user.

Examples of user behavior that can be classified include activities and habits, for example, going for a walk, gaze direction with respect to the apparatus 200, movement of the apparatus 200, touching of the apparatus 200, amount of continued use of the apparatus 200, etc.

The user behavior is classified as, for example, one or more different classes. In the following examples two classes are used, however different classes may be used. In this example, the user behavior is classified in to class A and class B. The user behavior that has been classified as class A is to be encouraged and the user behavior that is classified as class B is to be discouraged.

The user behaviors that are classified can, for example, be lifestyle choices, for example, different healthy or unhealthy lifestyle choices. In this example, healthy behaviors can be classified as class A and unhealthy behaviors can be classified as class B.

The user's behavior is monitored and is stored as behavior data. The behavior data can be stored over a prolonged period of time.

By using the user behavior data it is possible to infer an impact of an application 240 on user behavior. For example, machine learning may be used to estimate an impact of an application 240 on user behavior where the machine learning is based upon the previous monitored behavior of the user. The impact of the application 240 may be a measured impact or may be an expected impact.

In some examples, it is desirable to correlate the behavior of the user with particular applications 240. For example, the number of tokens $222_i$ provided for token bids $220_i$ for the application $240_i$ can be made dependent upon an expected impact of the application $240_i$ on user behavior learned from at least monitored behavior of the user associated with the application $240_i$. For example, fewer tokens $222_i$ are provided for token bids $220_i$ for an application $240_i$ that has an expected negative impact on user behavior than if it has an expected positive or neutral impact on user behavior. The number of tokens $222_i$ provided for token bids $220i$ for an application $240_i$ can be fewer for an impact that is more negative. For example, more tokens $222_i$ can be provided for token bids $220_i$ for an application $240_i$ that has an expected less negative impact on user behavior.

Impact is determined from monitoring the user's behavior over time. For instance, if a user usually responds to a notification from an application $240_i$ by browsing social media for 30 minutes, the classifier of the sub-module 216 can classify this application 240 in class B (negative impact). As a consequence of this classification, fewer tokens $222_i$ (compared to a less negative impact or impact classified in class A) are supplied to the bidder entity $300_i$ for bidding for the application $240_i$ thereby constraining the ability of the bidder entity $300_i$ to make token bids 220 and therefore reducing the negative impact, on average, on the user.

Although this process may be inaccurate to start, it will become more accurate as the classifier learns from the user's habits over time what the expected behavior of the user is in response to the application 240 having access to the user-output resource 230.

For example, the classifier 217 of the sub-module 216 can, in some but not necessarily all examples, be configured to, if an application 240 is given access to the user-output resource 230 of the apparatus 200, measure an impact of the application 240 on the user behavior and to provide tokens 222 for use in one or more token bids 220 for the application 240 to access the user-output resource 230 of the apparatus 200, where the number of tokens 222 provided for token bids 220 for the application 240 is dependent upon at least the measured impact of the application 240 on user behavior.

A behavior can be associated with an application 240 because, for example, there is time correlation between the behavior and the activity of the application 240. For example, a particular behavior is coincident in time with an access by the application 240 to the user-output resource 230. It can, for example, be possible to detect that a user behavior is associated with a particular application 240 because, for example, one or more of the following is detected:

i) the user is interacting with a user interface associated with that application 240, ii) the user has accessed content associated with that application 240 iii) the user is gazing towards content associated with that application 240 iv) the user is gazing towards the apparatus 200 while the application 240 is using the user-output resource 230.

The user behaviors may be user behaviors that extend beyond the apparatus 200. For example, the apparatus 200 can determine a mood of the user using keystroke data and/or sensors. In this example, healthy behaviors/moods can be classified as class A and unhealthy behaviors/moods can be classified as class B.

Figure 5:
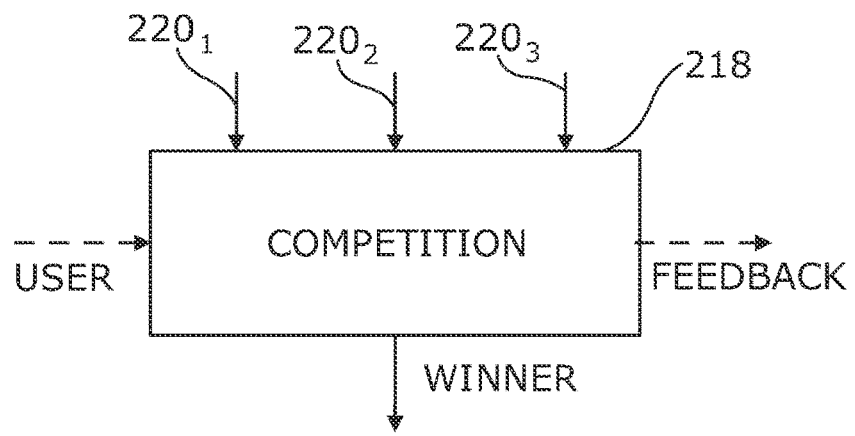
FIG. 5 shows an example embodiment of the subject matter described herein.

FIG. 5 illustrates an example of a second sub-module 218 for enabling resource access via token bidding 220. The second sub-module 218 is configured to receive one or more token bids $220_i$ for an application $240_i$ to access a user-output resource 230 of the apparatus 200. The sub-module 218 is configured to control access to the user-output resource 230 of the apparatus 200 in dependence upon the token bids $220_i$ for the applications $240_i$ to access the user-output resource 230 of the apparatus 200.

For example, the sub-module 218 may be configured to host a competition between the multiple bids $220_i$ for the different applications $240_i$. Each bid $220_i$, in effect, points towards a particular application $240_i$. The competition chooses a winning token bid $220_w$ and the sub-module 218 is configured to enable access to application $240_w$ that is pointed to by the winning token bid $220_w$. In some but not necessarily all examples the sub-module 218 is configured to enable access only to application $240_w$ that is pointed to by the winning token bid $220_w$ (the application 240 for which the winning bid was made) and prevents access to the other applications 240 for which non-winning bids were made.

The competition between token bids $220_n$ for different applications $240_n$ can, for example, be based upon a cost function. The cost function can be simple or more complex. For example, in one implementation, it may simply be based upon a size of the bid, where the highest bid (e.g. the highest number of tokens 222) wins the competition. However, in other implementations the cost function may take into account other variables than the size of token bid 220. In some examples, the user has at least some control on a dependency of the competition upon multiple variables and/or upon the multiple variables used within the cost function. For example, the user may be able to choose that the competition is based upon only the highest bid. In other examples, the user may be able to cause the competition to take into account the learned or expected impact of an application 240 on user behavior. In some examples, the competition may take into account the total number of tokens 222 that are in circulation and available to be bid. In some examples, the competition may take into account a previous history of winning bids and/or which bids for which applications 240 have won.

It will therefore be appreciated that the competition and the cost function can be flexible and can be adapted.

In some examples, the competition may take the form of an auction, such as a sealed bid auction, or an open, competitive bidding auction that allows adaptation of bids in response to knowledge of what the current highest bid is.

It will therefore be appreciated from the foregoing that there is a competitive market in tokens 222. The competition determines which one of multiple token bids 220 wins and the number of tokens 222 made available for future token bids 220.

The competitive market can be used to encourage first user behaviors (class A) and/or discourage second user behaviors (class B).

The sub-module 218 can be configured to control aspects of this market, for example by limiting or controlling supply of tokens 222. For example, the total number of tokens 222 provided for all applications 240 for a period of time or for a period of user interaction time can be fixed. In some examples, at least a minimum number of tokens 222 is provided for each application 240 or for at least some of the applications 240.

In some examples, it may be desirable to create a commercial market for the tokens 222. This can for example be achieved by selling tokens 222 and/or by allowing an exchange of tokens 222 such that if they have been provided to one bidder entity $300_i$ for use in bidding for one application $240_i$ they may be transferred from the bidder entity $300_i$ to another bidder entity $300_j$ for use in bidding for another application $240_j$.

For example, in one example, a bidder entity $300_i$ is configured to manage a supply $S_i$ of tokens 222 for use in one or more token bids $220_i$ for an application $240_i$ to access a user-output resource 230. The supply $S_i$ of tokens 222 comprising the provided tokens $222_i$ (if any) plus tokens 222 transferred into the supply $S_i$ (if any) minus tokens 222 transferred from the supply $S_i$ (if any). The supply $S_i$ of tokens 222 thus comprises the provided tokens $222_i$, if any, plus additional first tokens 222 transferred into the supply $S_i$ from one or more other supplies $\{S_x\}$ of tokens 222 (for use in one or more token bids $220X$ for other applications $240_x$ to access the user-output resource 230), if any, minus second tokens 222 transferred from the supply $S_i$ of tokens 222 (for use in one or more token bids 220 for the application $240_i$) to one or more supplies $\{S_x\}$ of tokens 222 (for use in one or more token bids 220 for other applications 240).

Each bidder entity $300_n$ for each application $240_n$, manages its own supply $S_n$ of tokens 222 for use in one or more token bids $220_n$ for that application $240_n$ to access a user-output resource 230. The supply $S_n$ of tokens 222 comprising the provided tokens $222_n$, if any, plus tokens transferred to it, if any, minus tokens transferred from it, if any.

Tokens 222 can be transferred from one supply $S_i$ of tokens (for use in one or more token bids 220 for an application $240_i$ to access the user-output resource 230) to another supply $S_j$ of tokens (for use in one or more token bids $220_j$ for an application $240_j$ to access the user-output resource 230).

The total number of tokens 222 used in inter-bidder entity transfers can remain constant. If N tokens 222 are transferred from one supply $S_i$ of tokens 222, that supply $S_i$ of tokens 222 decreases by N and if N tokens 222 are transferred to another supply $S_j$ of tokens 222, that supply $S_j$ of tokens 222 increases by N. If M tokens 222 are transferred to one supply $S_i$ of tokens 222, that supply $S_i$ of tokens 222 increases by M and if M tokens 222 are transferred from another supply $S_k$ of tokens 222 that supply $S_k$ of tokens 222 decreases by M.

In order to further improve the efficiency of the market, the sub-module 218 is configured to provide information concerning a winning bid $220_w$ back to the bidder entities 300. Information can, for example, be provided on all of the token bids 220 made and/or information provided on the winning token bid $220_w$. This enables a bidder entity 300 to better understand the competitive market and to subsequently increase or decrease its token bid 220 next time.

Figure 6:
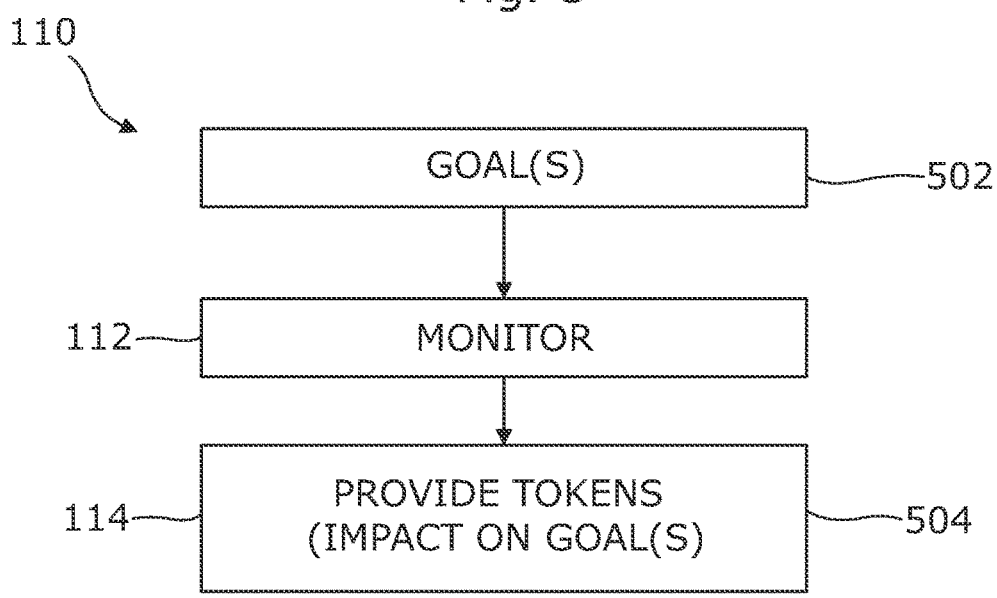
FIG. 6 shows another example embodiment of the subject matter described herein.

FIG. 6 illustrates a further example of the first sub-method 110 for enabling token bidding 220 for resource access. This method is as described in relation to FIG. 1. However, it additionally comprises, at block 502, enabling a user or someone else to define one or more goals. The goals could be recommended goals that a user can access remotely (e.g. download) and/or could be influenced by other users (e.g. users of a network or community group). In some examples, the goals can be default goals. The number of tokens 222 provided for token bids 220 for the application 240, at block 114, is, in this example 504, dependent upon at least an impact of the application 240 on a user achieving the defined one or more goals. The impact of the application 240 on a user achieving the defined one or more goals is determined from the monitored behavior of the user. The impact can, for example, be a measured impact or an expected impact. An expected impact can be calculated by, for example, machine learning or Bayesian inference.

For example, the apparatus 200 can be configured to determine an impact of the application 240 on a user achieving the defined one or more goals based, at least in part, on: previous measurements of impact of the application 240 on the user achieving the defined one or more goals, if any, and/or a declared expected impact of the application 240.

If an application 240 is given access to the user-output resource 230 of the apparatus 200, then the apparatus 200 measures an impact of the application 240 on the user achieving the defined one or more goals. Subsequently, the number of tokens 222 provided for token bids 220 for the application 240 is dependent upon at least the measured impact of the application 240 on a user achieving the defined one or more goals.

Thus the tokens 222 provided to bidder entities 300 for different applications 240 can be different based upon the different measured or expected impact of those applications 240, when they have access to the user-output resource 230, on achieving the defined one or more goals.

For example, the apparatus 200 can be configured to determine an expected impact of an application 240 on a user achieving the defined one or more goals based upon at least: scoring the application 240 positively if there is correlation between the use of the application 240 and the user achieving the defined one or more goals; scoring the application 240 negatively if there is a correlation between the use of the application 240 and the user not achieving the defined one or more goals; and using the cumulative score to control provision of tokens 222 for use in one or more token bids 220 for the application 240 to access a user-output resource 230 of the apparatus 200, wherein the number of tokens 222 provided for token bids 220 for the application 240 is dependent upon at least the cumulative score.

The magnitude of the score may be related to the extent to which the defined one or more goals are exceeded (or missed). A "zero" score is possible if there is no correlation.

In some, but not necessarily all, examples, the apparatus 200 comprises a user input device and the goals are personal behavioral goals specified by the user using the user input device.

A goal can be a wellbeing goal, for example, a goal set by the user (or someone else) relating to the user wellbeing. Wellbeing goals are designed such that completion of a goal is indicative of improvement in the user wellbeing. Examples of wellbeing Goals include (but are not limited to):

limiting time spent by the user on a user device;

limiting time spent by the user on specific applications (negative wellbeing applications); spending a minimum time on specific applications (positive wellbeing applications);

limiting time spent on the apparatus 200 when the user is in a particular emotion state or mood, as determined by the apparatus 200;

encouraging good behavior, for example increasing physical exercise, engaging in meditation or mindfulness activities, eating healthily, regular sleep times.

Figure 7:
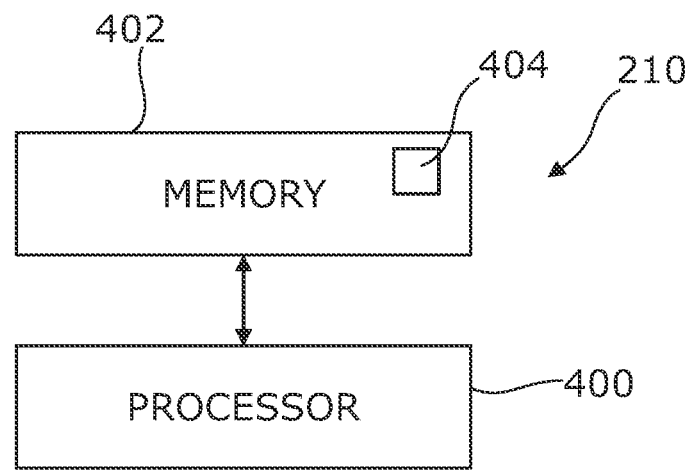
FIG. 7 shows an example embodiment of the subject matter described herein.

FIG. 7 illustrates an example of a controller 210. Implementation of a controller 210 may be as controller circuitry. The controller 210 may be implemented in hardware alone, have certain aspects in software including firmware alone or can be a combination of hardware and software (including firmware).

As illustrated in FIG. 7 the controller 210 may be implemented using instructions that enable hardware functionality, for example, by using executable instructions of a computer program 404 in a general-purpose or special-purpose processor 400 that may be stored on a computer readable storage medium (disk, memory etc) to be executed by such a processor 400.

The processor 400 is configured to read from and write to the memory 402. The processor 400 may also comprise an output interface via which data and/or commands are output by the processor 400 and an input interface via which data and/or commands are input to the processor 400.

The memory 402 stores a computer program 404 comprising computer program instructions (computer program code) that controls the operation of the apparatus 200 when loaded into the processor 400. The computer program instructions, of the computer program 404, provide the logic and routines that enables the apparatus 200 to perform the methods illustrated in FIGS. 1 to 6. The processor 400 by reading the memory 402 is able to load and execute the computer program 404.

The apparatus 200 therefore comprises:
at least one processor 400; and
at least one memory 402 including computer program code
the at least one memory 402 and the computer program code configured to, with the at least one processor 400, cause the apparatus 200 at least to perform:
receiving token bids 220 for an application 240 to access a user-output resource 230 of an apparatus 200;
controlling access to the user-output resource 230 of the apparatus 200 in dependence upon at least the token bid 220 for the application 240 to access the user-output resource 230; and
providing tokens 222 for use in one or more token bids 220 for the application 240 to access a user-output resource 230 of the apparatus 200 wherein the number of tokens 222 provided for token bids 220 for the application 240 is dependent upon at least a monitored behavior of the user.

Figure 8:
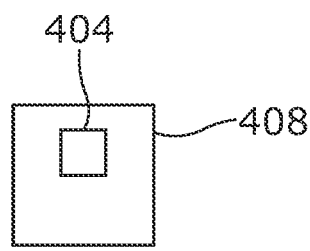
FIG. 8 shows another example embodiment of the subject matter described herein.

As illustrated in FIG. 8, the computer program 404 may arrive at the apparatus 200 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 404. The delivery mechanism may be a signal configured to reliably transfer the computer program 404. The apparatus 200 may propagate or transmit the computer program 404 as a computer data signal.

Computer program instructions that when run on a processor enable the following:
receiving a token bid 220 for an application 240 to access a user-output resource 230 of an apparatus 200;
controlling access to the user-output resource 230 in dependence upon at least a token bid 220 for the application 240 to access the user-output resource 230; and
providing tokens 222 for use in one or more token bids 220 for the application 240 to access a user-output resource 230 of the apparatus 200 wherein the number of tokens 222 provided for token bids 220 for the application 240 is dependent upon at least a monitored behavior of the user.

The computer program instructions may be comprised in a computer program, a non-transitory computer readable medium, a computer program product, a machine readable medium. In some but not necessarily all examples, the computer program instructions may be distributed over more than one computer program.

Although the memory 402 is illustrated as a single component/circuitry it may be implemented as one or more separate components/circuitry some or all of which may be integrated/removable and/or may provide permanent/semi-permanent/dynamic/cached storage.

Although the processor 400 is illustrated as a single component/circuitry it may be implemented as one or more separate components/circuitry some or all of which may be integrated/removable. The processor 400 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the Figs may represent steps in a method and/or sections of code in the computer program 404. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It can enable discrete outputs (for example classification, clustering) and continuous outputs (for example regression). Machine learning can for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The algorithms hereinbefore described may be applied to achieve the following technical effects: resource allocation and contention resolution.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory including computer program code
   the at least one memory and the computer program code configured to, with the at least one processor, cause the apparatus at least to perform:
   receiving a token bid for an application to access a user-output resource of the apparatus;
   controlling access to the user-output resource of the apparatus in dependence upon at least the token bid for the application to access the user-output resource of the apparatus; and
   providing tokens for use in one or more token bids for the application to access the user-output resource of the apparatus wherein the number of tokens provided for token bids for the application is dependent upon at least a monitored behavior of the user.

2. An apparatus as claimed in claim 1, wherein the number of tokens provided for token bids for the application is dependent upon an impact of the application on user behavior determined from at least the monitored behavior of the user.

3. An apparatus as claimed in claim 1, wherein the number of tokens provided for token bids for the application is dependent upon a machine learning classification of the application based on at least the monitored behavior of the user.

4. An apparatus as claimed in claim 1, wherein the number of tokens provided for token bids for the application is dependent upon an expected impact of the application on user behavior learned from at least monitored behavior of the user associated with the application.

5. An apparatus as claimed in claim 1, wherein the at least one memory and the computer program code are configured to, with the at least one processor, cause the apparatus at least to further perform, for each of a plurality of applications:
   providing tokens for use in one or more token bids for an application to access a user-output resource of the apparatus wherein the number of tokens provided for token bids for the application is dependent upon at least a monitored behavior of the user;
   receiving a token bid for the application to access a user-output resource of the apparatus; and
   enabling one of the plurality of applications to access the user-output resource of the apparatus in dependence upon at least the received plurality of token bids for the applications to access the user-output resource of the apparatus.

6. An apparatus as claimed in claim 5, wherein the at least one memory and the computer program code are configured to, with the at least one processor, cause the apparatus at least to further perform enabling access to a first one of the plurality of applications to the user-output resource of the apparatus in dependence upon at least a token bid for the first one of the plurality of applications to access the user-output resource being a winning token bid from amongst the plurality of received token bids.

7. An apparatus as claimed in claim 5, wherein the at least one memory and the computer program code are configured to, with the at least one processor, cause the apparatus at least to further perform controlling which application is granted access to the user-output resource in dependence upon multiple variables, wherein one variable is which token bid is highest, and wherein the user has at least some control on the dependency upon multiple variables and/or upon the multiple variables.

8. An apparatus as claimed in claim 5, wherein the total number of tokens provided to all applications per period of time or per period of user interaction time is fixed.

9. An apparatus as claimed in claim 5, wherein the provided tokens comprise a minimum number of tokens for at least some applications.

10. An apparatus as claimed in claim 1, further comprising at least one output device for providing sensory output to the user, wherein the user-output resource is a time segment of the output device that enables use of the output device to provide a sensory output to the user.

11. An apparatus as claimed in claim 1, further comprising a bidder entity configured to make a token bid for the application to access the user-output resource, wherein the bidder entity is part of the application running in an operating system environment of the apparatus or the bidder entity is a proxy that is an integral part of an operating system environment of the apparatus or the application, wherein the token bid is part of a request identifying at least the user-output resource, wherein the request has the same common format whether originating from the application or a proxy.

12. An apparatus as claimed in claim 11, wherein the bidder entity is configured to manage a supply of tokens for use in one or more token bids for the application to access a user-output resource, the supply of tokens comprising the provided tokens, if any, plus additional first tokens transferred from one or more supplies of tokens for use in one or more token bids for other applications to access a user-output resource, if any, minus second tokens transferred from the supply of tokens for use in one or more token bids for the application to one or more supplies of tokens for use in one or more token bids for other applications.

13. An apparatus as claimed in claim 11, wherein after a bidder entity has made a token bid for an application to access a user-output resource, feedback is provided to the bidder entity on a winning bid.

14. An apparatus as claimed in claim 1, wherein the at least one memory and the computer program code are configured to, with the at least one processor, cause the apparatus at least to further perform enabling the user to define one or more goals, wherein the number of tokens provided for token bids for the application is dependent upon at least an impact of the application on a user achieving the defined one or more goals.

15. A method comprising:
    receiving token bids for an application to access a user-output resource of an apparatus;

controlling access to the user-output resource of the apparatus in dependence upon at least the token bid for the application to access the user-output resource; and providing tokens for use in one or more token bids for the application to access the user-output resource of the apparatus wherein the number of tokens provided for token bids for the application is dependent upon at least a monitored behavior of the user.

16. A method as claimed in claim 15, wherein the number of tokens provided for token bids for the application is dependent upon an impact of the application on user behavior determined from at least the monitored behavior of the user.

17. A method as claimed in claim 15, wherein the number of tokens provided for token bids for the application is dependent upon a machine learning classification of the application based on at least the monitored behavior of the user.

18. A method as claimed in claim 15, wherein the number of tokens provided for token bids for the application is dependent upon an expected impact of the application on user behavior learned from at least monitored behavior of the user associated with the application.

19. A method as claimed in claim 15, further comprising, for each of a plurality of applications:

providing tokens for use in one or more token bids for an application to access a user-output resource of the apparatus wherein the number of tokens provided for token bids for the application is dependent upon at least a monitored behavior of the user; and receiving a token bid for the application to access a user-output resource of the apparatus; and enabling one of the plurality of applications to access the user-output resource of the apparatus in dependence upon at least the received plurality of token bids for the applications to access the user-output resource of the apparatus.

20. A non-transitory computer readable medium comprising program instructions stored thereon for performing at least the following:

receiving a token bid for an application to access a user-output resource of an apparatus;

controlling access to the user-output resource in dependence upon at least a token bid for the application to access the user-output resource; and providing tokens for use in one or more token bids for the application to access the user-output resource of the apparatus wherein the number of tokens provided for token bids for the application is dependent upon at least a monitored behavior of the user.

* * * * *